United States Patent Office 3,730,807
Patented May 1, 1973

3,730,807
AZIRIDINE-β-PROPIOLACTONE ADHESIVES
Harry A. Smith, Midland, and Bobbie E. Rooker, Hope, Mich., assignors to The Dow Chemical Company, Midland, Mich.
No Drawing. Filed Nov. 23, 1970, Ser. No. 92,181
Int. Cl. B32b 15/08; C08g 33/08
U.S. Cl. 156—331                                          9 Claims

ABSTRACT OF THE DISCLOSURE

The reaction products of (a) β-propiolactone and (b) N-substituted aziridines which bear one or more polar groups on the N-substituent are novel adhesives. E.g., the reaction product of (a) β-propiolactone and (b) N-(2-aminoethyl)aziridine is an excellent adhesive for bonding aluminum substrates. The adhesives are particularly effective in bonding metallic articles together.

BACKGROUND OF THE INVENTION

The reaction products formed by reacting a β-lactone, such as β-propiolactone, with ethyleneimine (aziridine) or an N-substituted aziridine were described by O. C. Dermer and G. E. Ham in "Ethylenimine and Other Aziridines," Academic Press, N.Y. (1969), pp. 325 and 349.

Additionally, the reaction products of various β-lactones with N-(2-cyanoethyl)aziridine and N-(2-phenethyl)aziridine were described by L. I. Peterson et al. in the following, commonly owned U.S. patent applications: (1) "Copolymers of N-(2-Cyanoethyl) Aziridine and β-Lactones," Ser. No. 787,992, filed Dec. 30, 1968, now USP 3,642,860; and (2) "Copolymers of β-Lactones and N-Phenethylaziridinnes," Ser. No. 787,993, filed Dec. 30, 1968, now USP 3,642,717.

Such prior art compounds were useful as textile finishing agents, rubber antioxidants, and fungicides.

SUMMARY OF THE INVENTION

It has now been discovered that the reaction products of (a) β-propiolactone and (b) N-substituted aziridines bearing at least one polar group on the N-substituent are extremely valuable as adhesives. These reaction products are particularly useful in bonding one metallic substrate to either a second metallic substrate or to a glass substrate.

The reaction products useful herein are typically colorless or light-colored resins. They vary from viscous liquids up to comparatively low melting solids (e.g. up to about 100° C.) and are readily soluble in a number of common organic solvents, such as methylene chloride, tetrahydrofuran, acetone, methyl ethyl ketone and other like halogenated hydrocarbons, ethers and ketones.

Aziridinyl reactants used in making the subject adhesives form a known class of compounds which can be represented by the formula

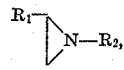

wherein $R_1$ is hydrogen or lower alkyl (e.g. methyl, ethyl, propyl, butyl, and the like) but is preferably hydrogen or methyl and is most preferably hydrogen; $R_2$ is an N-substituent bearing at least one polar group and is typically an aliphatic radical of from 2 to about 10 carbon atoms bearing at least one hydroxy, cyano or amino group. E.g., $R_2$ may be an alkyl group of an alkyl group whose chain length is interrupted by at least one atom of oxygen or nitrogen or by a carboxy

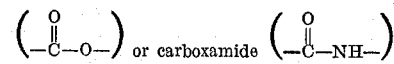

group. Representative examples of such aziridines include N-hydroxyalkylaziridines, such as N-(2-hydroxyethyl)-aziridine, N-(2-hydroxypropyl)aziridine, N-(2-hydroxybutyl)aziridine, N-(2-hydroxydecyl)aziridine, and the like; N-hydroxyalkyloxyalkylaziridines, such as N-(2-hydroxypropyloxypropyl)aziridine, N-(2-hydroxypropyloxyhexyl)aziridine, and the like; and compounds of the formula

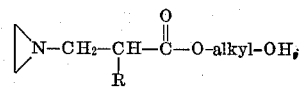

wherein R is hydrogen or methyl and the hydroxyalkyl group is from 2 to about 6 carbon atoms, such as 2-hydroxyethyl, 2-hydroxypropyl, 4-hydroxybutyl, 6-hydroxyhexyl, and the like; N-cyanoalkylaziridines, such as N-(2-cyanoethyl)aziridine, N-(2-cyanopropyl)aziridine, N-(6-cyanohexyl)aziridine, and N-aminoalkylaziridines, such as N-(2-aminoethyl)aziridine, N-(2-aminopropyl)aziridine, N-(2-hydroxybutyl)aziridine, N-(6-aminohexyl)aziridine, and the like; and compounds of the formula

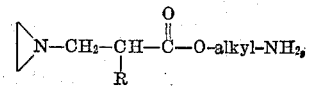

or

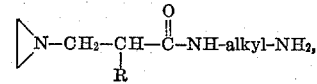

wherein R is hydrogen or methyl and the amino alkyl group is from 2 to about 6 carbon atoms, such as 2-aminoethyl, 2-aminopropyl, 4-aminohexyl, and the like; and the corresponding N-substituted 1,2-propylenimines, 1,2-butylenimines, and other like compounds that will be readily suggested to those skilled in the art. The preferred aziridinyl reactants are N-(2-hydroxyethyl)aziridine, N-(2-cyanoethyl)aziridine and N-(2-aminoethyl)aziridine,

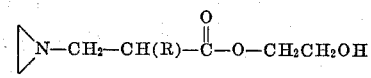

or

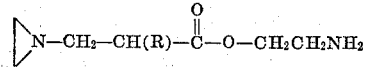

with the most preferred reactant being N-(2-aminoethyl) aziridine.

The subject adhesives are prepared by reacting by contacting β-propiolactone with the class of aziridinyl reactants illustrated above at a temperature sufficient to promote the reaction, e.g. from about 40° C. to about 80° C. in many instances.

The molar ratio of aziridine to lactone is not thought to be critical. A molar ratio of from 1:20 to 20:1 is suitable generally and a molar ratio of from 2:1 to 1:2 is preferred.

The subject adhesives may be conveniently applied as a dip, a spray, a bead, or any other such conventional manner to one or both surfaces of the substrates to be bonded. Further, the subject adhesives may be applied neat or as a solution in a suitable inert solvent. Suitable such inert solvents include methylene chloride, tetrahydrofuran, acetone, methyl ethyl ketone, etc. The solvent is typically removed after the adhesive is applied to the substrate and prior to bonding.

Additionally, the components of the adhesives, i.e. the β-propiolactone and aziridine, may be applied separately on opposing surfaces to be joined together; in this method, the adhesive reaction product is formed in situ at the glue line. In those instances where the adhesive is a solid, the technique of forming the adhesive composition in situ may be advantageous. Pressure and heat are generally applied to laminate structures prepared in this manner to effect maximum adhesion.

Many types of substrates may be bonded together with the subject adhesive, e.g. metals, such as aluminum and aluminum alloys, iron, steel, copper, and the like, glass, cellulosics, such as wood and paper, etc. Metallic and/or glass are preferred substrates with aluminum and aluminum alloys being most preferred. This preference is based on the fact that the bond strength of the adhesive is substantially increased when the laminate composite (adhesive and substrates) is warmed to temperatures of about 100° to 250° C., and, metals and/or glasses do not generally degrade under such thermal treatment.

SPECIFIC EMBODIMENTS

The following examples further illustrate the invention:

EXAMPLE 1

N-(2-hydroxyethyl)aziridine (0.5 mole) was added dropwise with stirring to β-propiolactone (0.5 mole or 0.6 mole) at ambient temperature. The resulting mixture was allowed to exotherm and stirred overnight under ambient conditions. Volatiles were removed from the mixture under reduced pressure leaving a novel, light-colored resin in greater than 95% yield by weight, based on starting materials; average molecular weight of about 625. This method of preparation will hereafter be referred to as Method 1–1.

Method 1–1 was duplicated except that each reagent was dissolved in 200 ml. of $CH_2Cl_2$ prior to mixing. The exotherm temperature was thus regulated by the boiling point of the solution. This technique will be referred to hereafter as Method 1–2. In many instances, this technique resulted in resins of even lighter color. Method 1–2 is preferred for those reactions containing especially reactive aziridines since the possibility or extent of crosslinking is minimized. The novel, resinous product obtained after removal of the solvent varied from a viscous liquid to a low melting solid (M.P.≅20–40° C.) and had an average molecular weight of approximately 1300 for the solid products.

The product cured to an insoluble solid when warmed for 15–30 minutes at a temperature of from 200–250° C.

EXAMPLE 2

N-(2-cyanoethyl)aziridine was reacted with β-propiolactone in accordance with Methods 1–1 and 1–2 above, except for the aziridinyl reactant. The product was a light-colored, viscous resin obtained in greater than 95% yield by weight, based on starting material.

EXAMPLE 3

N-(2-aminoethyl)aziridine was reacted with β-propiolactone in accordance with Methods 1–1 and 1–2 above, except for the aziridinyl reactant. The novel product from Method 1–1 was obtained as a rubbery solid. The novel product from Method 1–2 was obtained in approximately 100% yield as an off-white colored solid melting at 90°–100° C.; average molecular weight was 775. The product cured to an insoluble solid when warmed for 5 minutes at temperatures above about 100° C. In many inntances, it would be advantageous to apply β-propiolactone and N-(2-aminoethyl)aziridine to opposing substrate surfaces and form this adhesive product in situ.

Products from Examples 1–3 were individually and separately applied as the sole adhesive to aluminum foil strips or aluminum metal coupons whose surfaces were prepared in accordance with ASTM D 2651–67. The samples were cured for 15 minutes at the temperature indicated in Table I. "Peel" adhesion was measured pursuant to ASTM D 1876–69 and "Lap Shear" adhesion pursuant to ASTM D 1002–64; the results are summarized in Table I.

TABLE I

| Example | Moles of lactone | Method | Cure temp., ° C. | Lap shear, p.s.i. | T-peel, lbs./in. |
| --- | --- | --- | --- | --- | --- |
| 1-a | 0.6 | 1-1 | 250 | 900 | 2.3 |
| 1-b | 0.6 | 1-2 | 225 | Low | 0.6 |
| 1-c | 0.5 | 1-1 | 250 | 1,100 | 3.0 |
| 1-d | 0.5 | 1-2 | 250 | 800 | 1.6 |
| 2-a | 0.6 | 1-1 | 225 | 1,000 | 1.6 |
| 2-b | 0.6 | 1-2 | 250 | 1,100 | 3.0 |
| 2-c | 0.5 | 1-1 | 200 | 400 | 2.0 |
| 2-d | 0.5 | 1-2 | 250 | 900 | 3.5 |
| 3-b | 0.6 | 1-2 | 225 | 1,100 | 4.0 |
| 3-c | 0.5 | 1-2 | 225 | 2,000 | 3.0 |
| Control [1] | | | 100 | 850 | 1.4 |

[1] The control was a conventional, bisphenol-A based, epoxy resin cured with triethylenetetramine.

Similar adhesive results are obtained using other substrates, e.g. copper-to-copper, copper-to-aluminum, glass-to-glass, aluminum-to-glass, etc. Likewise, effective adhesive compositions are obtained by replacing the aziridines used in Examples 1–3 with other aziridines as noted above.

It is understood that the adhesive composition set forth above may additionally include conventional dyes, fillers, extenders, and re-enforcement agents, such as fiber glass, etc. as well as fungicides and other biological toxicants, which are substantially inert to the subject adhesives.

The products produced by reacting (a) β-propiolactone with (b) an N-(2-hydroxyalkyl)aziridine or an N-(2-aminoalkyl)aziridine having from 2 to 4 carbon atoms in the N-substituent are novel products. They are illustrated by Examples 1 and 3 above.

We claim:

1. In the process of adhering a first cellulosic, metal or glass substrate to a second cellulosic, metal or glass substrate by means of an adhesive composition, the improvement consisting of using an adhesive composition comprising the reaction product of (a) β-propiolactone and (b) an aziridine of the formula

wherein $R_1$ is hydrogen or lower alkyl and $R_2$ is an aliphatic radical of from 2 to 10 carbon atoms bearing at least one hydroxy, cyano or amino group, said aliphatic radical being an alkyl group or an alkyl group whose chain length is interrupted by at least one atom of oxygen or nitrogen or by a carboxyl or carboxamide group.

2. The process improvement defined in claim 1 wherein $R_2$ is a hydroxy-, cyano- or amino-substituted alkyl group of from 2 to 4 carbon atoms.

3. The process improvement defined in claim 2 wherein $R_2$ is 2-hydroxyethyl, 2-cyanoethyl, or 2-aminoethyl.

4. The process improvement defined in claim 3 wherein $R_2$ is 2-aminoethyl.

5. The process improvement defined in claim 1 wherein $R_1$ is hydrogen or methyl.

6. The process improvement defined in claim 5 wherein $R_1$ is hydrogen.

7. The process defined in claim 6 wherein said aziridine has the formula

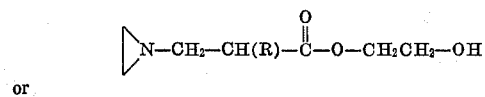

or

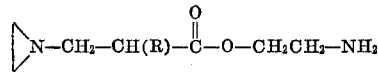

wherein R is hydrogen or methyl.

8. The process defined in claim 1 wherein said first and second substrates are metal or glass.

9. The process defined in claim 8 wherein said first and second substrates are aluminum or an aluminum alloy.

References Cited

UNITED STATES PATENTS

| | | | |
|---|---|---|---|
| 3,514,369 | 5/1970 | Uelzmann et al. | 156—331 X |
| 3,624,047 | 11/1971 | Suita | 260—78.3 |
| 3,642,972 | 2/1972 | Needles et al. | 156—331 X |

HAROLD ANSHER, Primary Examiner

U.S. Cl. X.R.

161—192, 219, 250; 260—78.3 R